Patented Oct. 24, 1967

3,349,135
3,4-DIHYDROXY-BENZYLOXYAMINE
David John Drain, Welwyn Garden City, John Gordon Bernard Howes, Hertford, and Haydn Windsor Richard Williams, Welwyn, England, assignors to T. J. Smith & Nephew Limited, Kingston-Upon-Hull, England
No Drawing. Filed May 14, 1963, Ser. No. 280,422
Claims priority, application Great Britain, May 15, 1962, 18,554/62
The portion of the term of the patent subsequent to Dec. 28, 1982, has been disclaimed
7 Claims. (Cl. 260—621)

This invention relates to a hydroxylamine derivative and to processes for making it.

It is an object of the present invention to provide a compound which is a potent inhibitor of the enzymes responsible for the metabolism of 5-hydroxy-tryptamine (5HT) and catecholamines both in vitro and in vivo and which, when administered to mammals has an effect on the central nervous system.

It is a further object of the present invention to provide a compound useful in the treatment of disorders associated with and attributable to abnormal levels of 5-hydroxy-tryptamine and/or catecholamines.

It is a still further object of the present invention to provide a compound achieving the above objects when administered in the form of its salts with physiologically tolerable acids.

With the above objects in mind, the present invention provides the compound 3,4-dihydroxy-benzyloxyamine which has the formula:

I 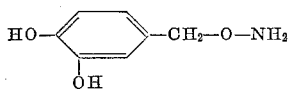

One process of the invention for making 3,4-dihydroxy-benzyloxyamine comprises reacting at least two molecular proportions of hydrazine with a compound of the general formula:

II 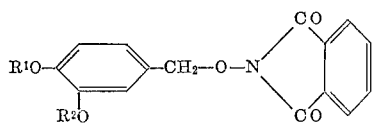

wherein $R^1$ and $R^2$ represent aliphatic acyl or aromatic acyl groups or together represent a carbonyl group.

During this reaction the phthaloyl group and the acyl groups or the carbonyl group are split off and replaced by hydrogen atoms by what may be termed hydrazinolysis.

The invention further includes a process for making 3,4-dihydroxy-benzyloxyamine which comprises reacting hydrazine with a compound of the general formula:

III 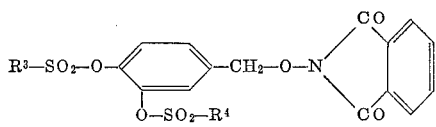

wherein $R^3$ and $R^4$ represent alkyl or aryl radicals and hydrolyzing off the $R^3$—$SO_2$— and $R^4$—$SO_2$— groups. The phthaloyl group is split off by hydrazinolysis but a further hydrolysis step, preferably with alkali metal hydroxide, is required to remove the $R^3$—$SO_2$— and $R^4$—$SO_2$— groups.

The hydrazine is preferably in the form of hydrazine hydrate.

The hydroxylamine derivative formed by either process can be converted to an acid-addition salt by methods known per se. For example, it can be converted to the hydrochloride by reaction with ethanolic hydrogen chloride or to the hydrogen phosphate or dihydrogen phosphate by reaction with orthophosphoric acid or to the oxalate by reaction with a solution of anhydrous oxalic acid in isopropanol.

The invention will be illustrated by the following examples to which, however, it is not limited. These examples will be preceded by preparations of some of the starting materials employed. In the preparations and examples all the temperatures are in degrees centigrade and weights are in grams (g.).

PREPARATION 1

Part A.—*3,4-dibenzenesulphonyloxy-toluene*

Benzenesulphonyl chloride (9.2 g., 0.052 mole) was added portionwise, over 10 minutes, to a solution of 4-methyl-catechol (3.1 g., 0.025 mole) in pyridine (40 ml.). The mixture was left at room temperature for 2 hours and poured into water (500 ml.). The precipitated oil solidified on scratching, and was filtered off and dried. The crude product (M.P. 106–115°) was recrystallized from ethanol (60 ml.) to give the pure compound as colorless prisms, M.P. 125.5–126°. Yield 7.1 g. (70%).

Part B.—*3,4-dibenzenesulphonyloxy-benzyl bromide*

A solution of bromine (3.2 g., 0.02 mole) in carbon tetrachloride (50 ml.) was added dropwise, over 3 hours, to a gently refluxing solution of 3,4-dibenzenesulphonoxy-toluene (8.08 g., 0.02 mole) in carbon tetrachloride (125 ml.). The mixture was irradiated throughout by means of a 500 watt projector bulb. The solution was evaporated under reduced pressure to give an oil, which solidified on scratching. The pure compound crystallized from 1:1 acetone:methanol (1 part v./w.) in colorless needles, M.P. 124–124.5°. Yield 4.2 g. (43%).

Part C.—*N-(3,4-dibenzenesulphonyloxy-benzyloxy) phthalimide*

A mixture of 3,4-dibenzenesulphonyloxy-benzylbromide (2.42 g., 0.005 mole), N-hydroxy-phthalimide (0.82 g., 0.005 mole) and triethylamine (0.505 g., 0.005 mole) in acetonitrile (50 ml.) was boiled under reflux for 1 hour. The solution was evaporated under reduced pressure and the gummy residue triturated with water, when it slowly solidified. The pure product crystallized from 1:1 acetone:methanol (1.5 parts v./w.) as colorless needles, M.P. 119.5–120.5°. Yield 1.6 g. (56%).

PREPARATION 2

*N-(3,4-carbonyldioxy-benzyloxy)phthalimide*

A warm solution of 3,4-carbonyldioxy-benzyl chloride (83.7 g., 0.454 mole) (Ewins, J.C.S., 95, 1485) in acetonitrile (200 ml.) was added to a solution of N-hydroxyphthalimide (73.9 g., 0.454 mole) and triethylamine (45.9 g., 0.454 mole) in acetonitrile (300 ml.), and the mixture heated on the steam bath until colorless (15 minutes). The precipitate was filtered from the cold mixture, washed with water and acetone, and dried, giving the product as small colorless needles, M.P. 233–4° (126 g., 89%). The compound may be recrystallized from a large volume of ethyl acetate, the melting point not being affected.

EXAMPLE 1

*3,4-dibenzenesulphonyloxy-benzyloxyamine*

A solution of N-(3,4-dibenzenesulphonyloxy-benzyloxy)phthalimide (5.65 g., 0.01 mole) and 100% hydrazine hydrate (0.55 g., 0.011 mole) in ethanol (50 ml.) was boiled under reflux for 1 hour. The mixture was cooled, filtered, the ethanol removed from the filtrate under reduced pressure, and the residue treated with chloroform (50 ml.). The chloroform solution was filtered, and concentrated under reduced pressure to a pale yellow gum. This was dissolved in boiling isopropanol, cooled, the solvent decanted, and the precipitated gum again dissolved in boiling isopropanol. On cooling the product was obtained as a crystalline solid. The pure product crystallized from isopropanol in colorless prisms, M.P. 90–92°. Yield 3.25 g. (75%).

EXAMPLE 2

*3,4-dihydroxy-benzyloxyamine*

Part A.—100% hydrazine hydrate (2.5 g., 0.05 mole) was added to a suspension of N-(3,4-carbonyldioxy-benzyloxy)phthalimide (3.11 g., 0.01 mole) in ethanol (30 ml.), and the mixture allowed to stand at room temperature, with occasional stirring, for 24 hours. The precipitate was filtered off, the filtrate evaporated to dryness under reduced pressure, and the residual oil dissolved in water (3 ml.). The product crystallized out slowly on standing overnight at 5°, and was filtered off and dried (1.18 g., M.P. 120–121°). The pure product crystallized from isopropanol (8 parts v./w.) as colorless prisms, M.P. 122°. Yield 1.05 g. (67%).

Part B.—A solution of 85% potassium hydroxide (2.54 g., 0.0384 mole) in methanol (30 ml.) was added, under nitrogen, to a suspension of 3,4-dibenzenesulphonyloxy-benzyloxyamine (5.6 g., 0.0128 mole) in methanol (30 ml.). The mixture was boiled under reflux for 45 minutes, cooled, glacial acetic acid (2 ml.) added, and the precipitate filtered off. The filtrate was evaporated to dryness, and extracted with ether (2×100 ml. portions). Evaporation of the ether from the combined extracts gave a gum, which slowly solidified on standing. It was recrystallized from isopropanol to give the product as colorless prisms, M.P. 122°. Yield 0.85 g. (42%).

We claim:
1. 3,4-dihydroxy-benzyloxyamine.
2. A salt of 3,4-dihydroxy-benzyloxyamine with a physioliogically tolerable acid.
3. A method of preparing 3,4-dihydroxy-benzyloxyamine which comprises reacting at least two molecular proportions of hydrazine with a compound of formula:

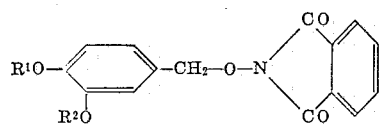

wherein $R^1$ and $R^2$ are selected from the group consisting of aromatic acyl and aliphatic acyl groups.

4. A method of preparing 3,4-dihydroxy-benzyloxyamine which comprises reacting hydrazine with a compound of formula:

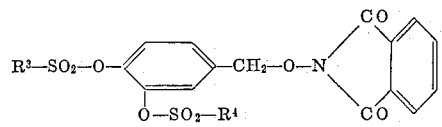

wherein $R^3$ and $R^4$ are selected from the group consisting of the alkyl and aryl radicals, and hydrolysing off the $R^3$—$SO_2$— and $R^4$—$SO_2$— groups.

5. A method as claimed in claim 4 in which the hydrazine is initially in the form of hydrazine hydrate.

6. A method as claimed in claim 4 in which the hydrolysis is achieved with an alkali metal hydroxide.

7. A method of preparing 3,4-dihydroxy-benzyloxyamine which comprises reacting at least two molecular proportions of hydrazine with N-(3,4-carbonyldioxy-benzyloxy)phthalimide.

References Cited

UNITED STATES PATENTS 3,226,446    12/1965    Drain et al. _____ 260—621

LEON ZITVER, *Primary Examiner.*

D. M. HELFER, H. ROBERTS, *Assistant Examiners.*